US012730312B2

(12) United States Patent
Christmas

(10) Patent No.: US 12,730,312 B2
(45) Date of Patent: Sep. 8, 2026

(54) HOLOGRAM WAVEGUIDING

(71) Applicant: Dualitas Ltd, Milton Keynes (GB)

(72) Inventor: Jamieson Christmas, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 471 days.

(21) Appl. No.: 18/177,952

(22) Filed: Mar. 3, 2023

(65) Prior Publication Data

US 2024/0061263 A1 Feb. 22, 2024

(30) Foreign Application Priority Data

Aug. 16, 2022 (GB) .................................... 2211971

(51) Int. Cl.
*G02B 27/01* (2006.01)
*G02B 27/00* (2006.01)
*G03H 1/22* (2006.01)

(52) U.S. Cl.
CPC ..... *G02B 27/0103* (2013.01); *G02B 27/0093* (2013.01); *G02B 27/0179* (2013.01); (Continued)

(58) Field of Classification Search
CPC ............ G02B 27/0093; G02B 27/0103; G02B 27/0179; G02B 2027/0187; G03H 1/0005; (Continued)

(56) References Cited

U.S. PATENT DOCUMENTS 10,275,098 B1 * 4/2019 Clements ............... G02B 30/56
10,732,721 B1 * 8/2020 Clements ............... B66B 1/468
(Continued)

FOREIGN PATENT DOCUMENTS

GB 2575658 A 1/2020
KR 10-2020-0057773 5/2020
(Continued)

OTHER PUBLICATIONS

Search and Examination Report issued in application GB 2211971.3 dated Feb. 2, 2023 (4 pages).
(Continued)

*Primary Examiner* — Nicholas R. Pasko
(74) *Attorney, Agent, or Firm* — McDonnell Boehnen Hulbert & Berghoff LLP

(57) ABSTRACT

Embodiments include systems and methods for operating a head-up display for a vehicle. Embodiments include a first light engine, a second light engine, at least one waveguide, an eye-box for a viewer, and a light detector. The first light engine is arranged to form a first wavefront (e.g., a first holographic wavefront) formed by illuminating a first hologram of a picture, and the second light engine is arranged to form a second wavefront. The waveguide includes an input, pair of opposing reflective surfaces, and an output. The input is arranged to receive the first and second holographic wavefronts. The pair of opposing reflective surfaces is arranged to waveguide the first holographic wavefront and second wavefront therebetween by internal reflection. A first surface of the pair of opposing reflective surfaces is partially transmissive thereby forming an output port for a plurality of replicas of the first and second holographic wavefronts.

20 Claims, 10 Drawing Sheets

(52) U.S. Cl.
CPC ... *G03H 1/2205* (2013.01); *G02B 2027/0187* (2013.01); *G03H 2001/2284* (2013.01); *G03H 1/2294* (2013.01); *G03H 2223/16* (2013.01); *G03H 2226/05* (2013.01)

(58) Field of Classification Search
CPC ............... G03H 1/2205; G03H 1/2294; G03H 2001/0033; G03H 2001/0061; G03H 2001/2284; G03H 2226/05; G03H 2222/16; G03H 2210/52; G06F 3/017
See application file for complete search history.

(56) References Cited

U.S. PATENT DOCUMENTS

| | | | | |
|---|---|---|---|---|
| 11,157,114 | B1 * | 10/2021 | Herman | G06F 3/0425 |
| 2009/0295730 | A1 * | 12/2009 | Shin | G06F 3/0221<br>455/566 |
| 2012/0224062 | A1 * | 9/2012 | Lacoste | G09G 5/14<br>348/148 |
| 2019/0011705 | A1 | 1/2019 | Robbins et al. | |
| 2020/0290513 | A1 * | 9/2020 | Karafin | G06F 3/017 |
| 2021/0072379 | A1 | 3/2021 | Christmas et al. | |
| 2021/0165212 | A1 * | 6/2021 | Christmas | G03H 1/2249 |
| 2021/0191319 | A1 * | 6/2021 | Christmas | G03H 1/2205 |
| 2021/0255459 | A1 | 8/2021 | Christmas | |

FOREIGN PATENT DOCUMENTS

| | | | |
|---|---|---|---|
| KR | 10-2020-0057773 | A | 5/2020 |
| KR | 10-2021-0068983 | A | 6/2021 |
| KR | 10-2021-0083586 | A | 7/2021 |
| KR | 10-2021-0105824 | A | 8/2021 |

OTHER PUBLICATIONS

Extended European Search Report issued in application EP 23161786.1 dated Jul. 3, 2023 (8 pages).
Office Action dated Oct. 8, 2024 issued in application KR 10-2023-0043087 (10 pages).
English translation of Office Action dated Oct. 8, 2024 issued in application KR 10-2023-0043087 (10 pages).
Examination Report dated Apr. 15, 2025 issued in application KR 10-2023-0043087 (9 pages).
English translation of Office Action dated Apr. 15, 2025 issued in application KR 10-2023-0043087 (9 pages).
Examination Report issued on Sep. 15, 2025 in EP 23161786.1 (6 pages).

* cited by examiner

HOLOGRAM WAVEGUIDING

CROSS-REFERENCE TO RELATED APPLICATIONS

This application claims priority under 35 U.S.C. § 119 to UK Patent Application GB 2211971.3 titled "Hologram Waveguiding," filed on Aug. 16, 2022, and currently pending. The entire contents of GB 2211971.3 are incorporated by reference herein for all purposes.

FIELD

The present disclosure relates to a holographic projector and a method of holographic projection. More specifically, the present disclosure relates a head-up display including an object detection system and a method of detecting objects for enhanced holographic image formation. Embodiments relate to a waveguide head-up display, a method of increasing the eye-box size of a head-up display and a method of expanding the pupil of a head-up display.

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

There is disclosed herein a head-up display for a vehicle. The head-up display comprises a first light engine, a second light engine, at least one waveguide, an eye-box for a viewer and a light detector. The first light engine is arranged to form a first wavefront. The first wavefront is a first holographic wavefront formed by illuminating a first hologram of a picture for head-up display. The second light engine is arranged to form a second wavefront for object detection. The waveguide comprising an input, pair of opposing, reflective surfaces; and an output. The input is arranged to receive the first holographic wavefront and second wavefront. The pair of opposing reflective surfaces is arranged to waveguide the first holographic wavefront and second wavefront therebetween by internal reflection. A first surface of the pair of opposing reflective surfaces is partially transmissive thereby forming an output port for a plurality of replicas of the first holographic wavefront and second wavefront. The eye-box for a viewer receives the first holographic wavefront. The viewer forms a first holographic image of the picture, that appears in a region between the first hologram and eye-box, from the first holographic wavefront. The second wavefront forms a light pattern in the region. The light detector is arranged to receive a light return of the light pattern (only) if an object is present in the region. A "light return" means detection of scattered or reflected light of the light pattern. In other words, the light detector is arranged (e.g. directed) to detect any light of the light pattern that is scattered or reflected from the region.

The inventor has realized that the waveguide can be used not only to expand the eye-box of a holographic head-up display but also expand the operating range of a detection system. Specifically, the waveguide can be used to replicate a second wavefront carrying a light pattern for object detection. In some embodiments, this replication increases the size of the area illuminated by a light pattern for object detection. This is particularly advantageous when the holographic image is a real image formed downstream of the hologram and the display device is particularly small—thereby introducing a significant angular restriction. Further still, each replica of the light pattern for object detection propagates along a different optical path and so there is a small time difference between arrival of the replicas at the target plane. This time difference can be useful for object detection. For example, this time difference provides a high level of temporal resolution because the time difference between replicas can be only a few picoseconds. Further advantageously, it is not necessary for the second light engine to precisely compensate for a decrease in intensity of reach replica with propagation distance—unlike when the wavefront corresponds to a meaningful picture—because the system is inherently based around detecting changes. In this respect, there is positive synergy between the waveguide and a detection system.

The region may be a region inside the vehicle. That is, the first holographic image may be a real image formed downstream of the hologram.

The light pattern may comprise at least one discrete light feature. The light pattern may comprise an area of uniform illumination.

The picture may comprise a visual representative of an input device of the vehicle. The input device may comprise a drive selection unit comprises at least one selected from the group comprising a park, drive, neutral and reverse drive selection button. The input device may additionally or alternatively comprises a start-stop button for the vehicle.

The second wavefront may be a second holographic wavefront formed by illuminating a second hologram of the light pattern. The second light engine may be arranged to change the position of the second wavefront in time. The second light engine and light detector may form a light detection and ranging system.

The light detector may comprise a plurality of independent light detecting elements, each having an independent field of view of the region, such as a CCD array or SPAD array. In some embodiments, each light detecting elements outputs a respective time of flight measurement.

The first light engine may be arranged to change the first hologram if the light detector detects a light return. The change to the first hologram may correspond to a change in at least part of the visual representation of the input device.

The first holographic wavefront may comprise visual light and the second wavefront may comprise invisible light. The second wavefront may comprise infra-red light and the detector may be a detector of infra-red light.

There is also disclosed herein a method of holographic projection. The method comprises the step of forming a first holographic wavefront by illuminating a first hologram of a picture. The step of forming a first holographic wavefront may be performed using a first light engine. The method further comprises the step of forming a second wavefront. The step of forming a second wavefront may be performed using a second light engine. The method further comprises the step of receiving the first holographic wavefront and second wavefront at an input of a waveguide. The method further comprises the step of waveguiding the first holographic wavefront and second wavefront between a pair of opposing reflective surfaces of the waveguide by internal reflection. The method further comprises the step of outputting a plurality of replicas of the first holographic wavefront and second wavefront at a partially transmissive first surface of the pair of opposing reflective surfaces, the first surface thereby forming an output port of the waveguide. The method further comprises receiving the first holographic wavefront and second wavefront at an eye-box for a viewer. A first holographic image of the picture is formed for a viewer at the eye-box, the first holographic image appearing in a region between the first hologram and eye-box, wherein the second wavefront forms a light pattern in the region for a viewer at the eye-box. The method further comprises detecting/receiving at a light detector a light return of the light pattern if an object is present in the region.

In some embodiments, the region between the first hologram and the eye-box is a region inside the vehicle. In some embodiments, the step of forming the light pattern comprises forming at least one discrete light feature.

In some embodiments, the light pattern comprises an area of uniform illumination. In some embodiments, the picture comprises a visual representative of an input device of the vehicle. In some embodiments, the input device comprises a drive selection unit comprises at least one selected from the group comprising a park, drive, neutral and reverse drive selection button. In some embodiments, the input device comprises a start-stop button for the vehicle.

In some embodiments, the step of forming the second wavefront comprising forming a second holographic wavefront. The step of forming the second holographic wavefront may comprise illuminating a second hologram. The second hologram may be a hologram of the light pattern.

In some embodiments, the method further comprises changing the position of the second wavefront in time. Changing the position of the second wavefront in time may comprise using the second light engine.

In some embodiments, the second light engine and light detector form a light detection and ranging system.

In some embodiments, the step of detecting the light return comprises using a plurality of independent light detecting elements, each having an independent field of view of the region, such as a CCD array or SPAD array, to detect the light return.

In some embodiments, the method further comprises changing the first hologram if the first detector detects a light return. The step of changing the first hologram may be performed by/using the first light engine. The step of changing the first hologram may comprise changing the first hologram to correspond to a change in at least part of the visual representation of the input device.

The first holographic wavefront may comprise visual light and the second wavefront may comprises invisible light. The second wavefront comprises infra-red light and the detector is a detector of infra-red light.

Features and advantages described in relation to the head-up display may be applicable to the method of holographic projection, and vice versa.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field may also be called a holographic wavefront for avoidance of confusion with light field displays. The holographic light field or wavefront that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to 2π) which represents the amount of phase retardation provided by that pixel. For example, a pixel of the spatial light modulator described as having a phase value of π/2 will retard the phase of received light by π/2 radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
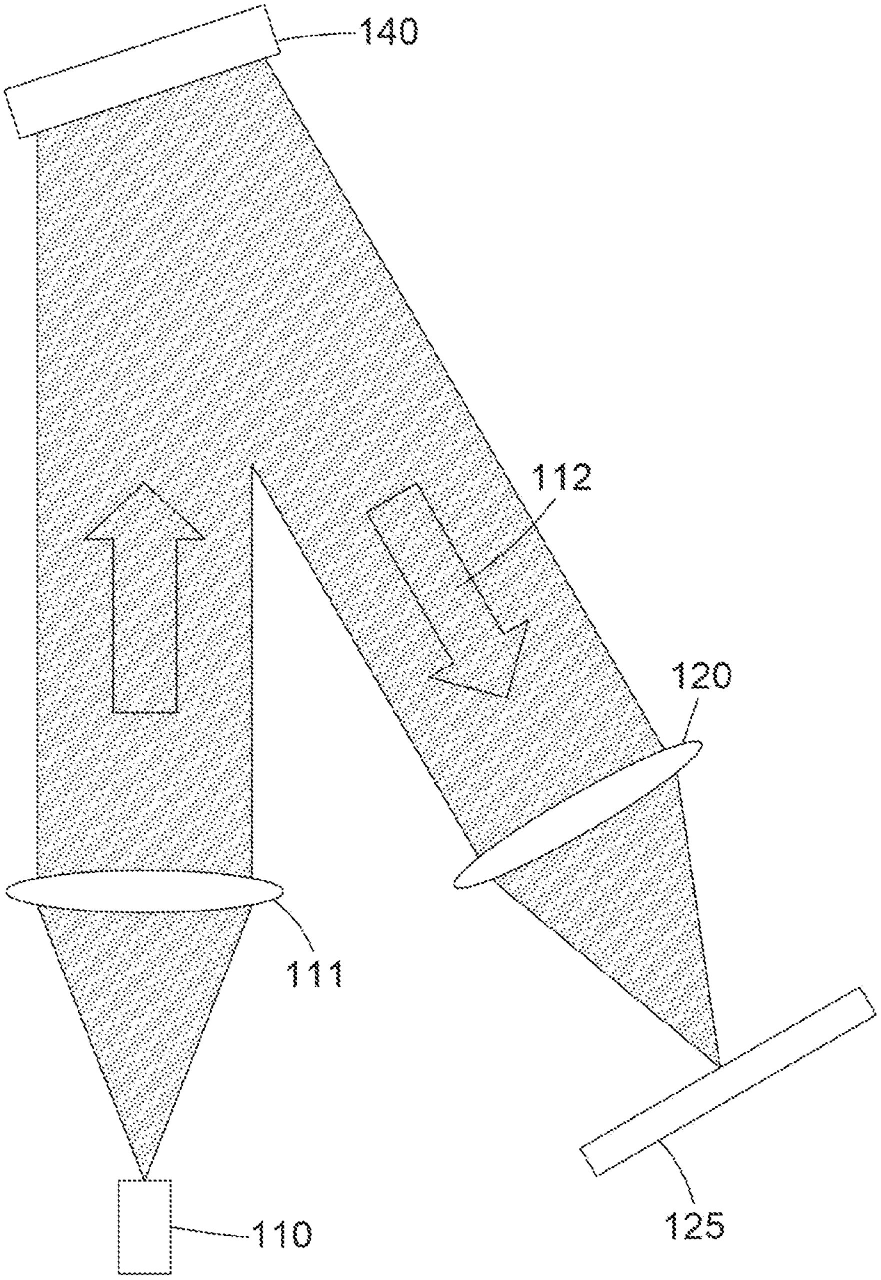
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Viewing Window and Long Throw Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channelling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
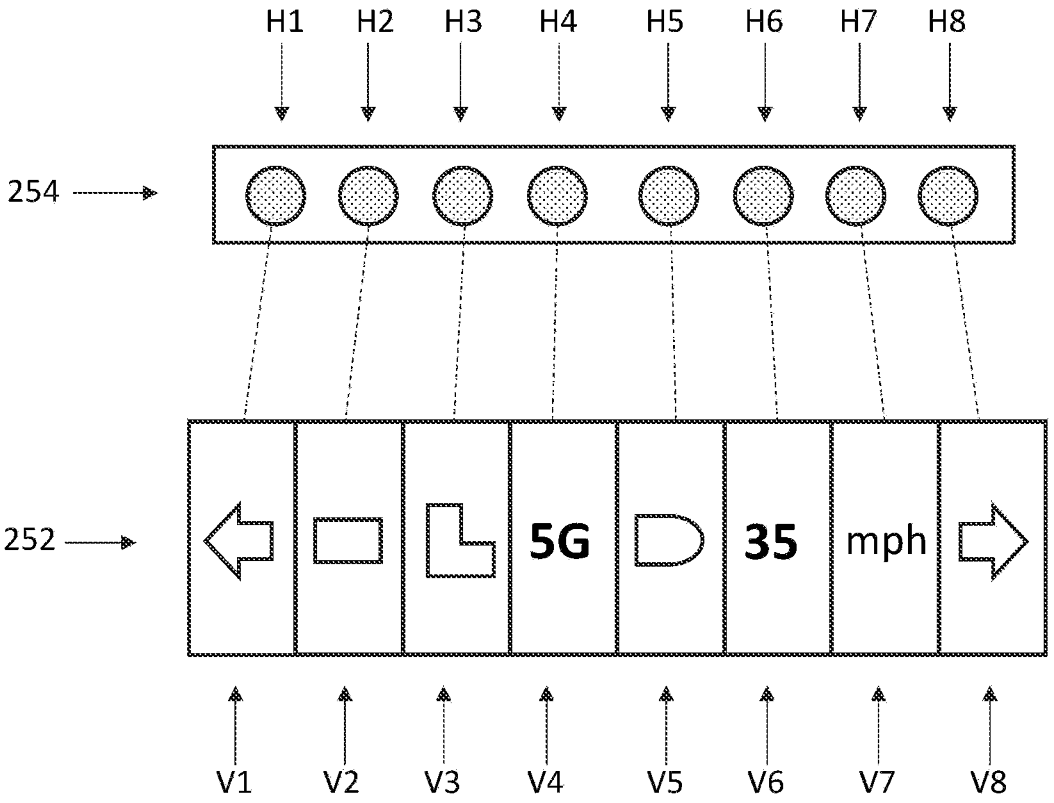
FIG. 2 shows an image for projection comprising eight image areas/components, V1 to V8, and cross-sections of the corresponding hologram channels, H1-H8.
Figure 3:
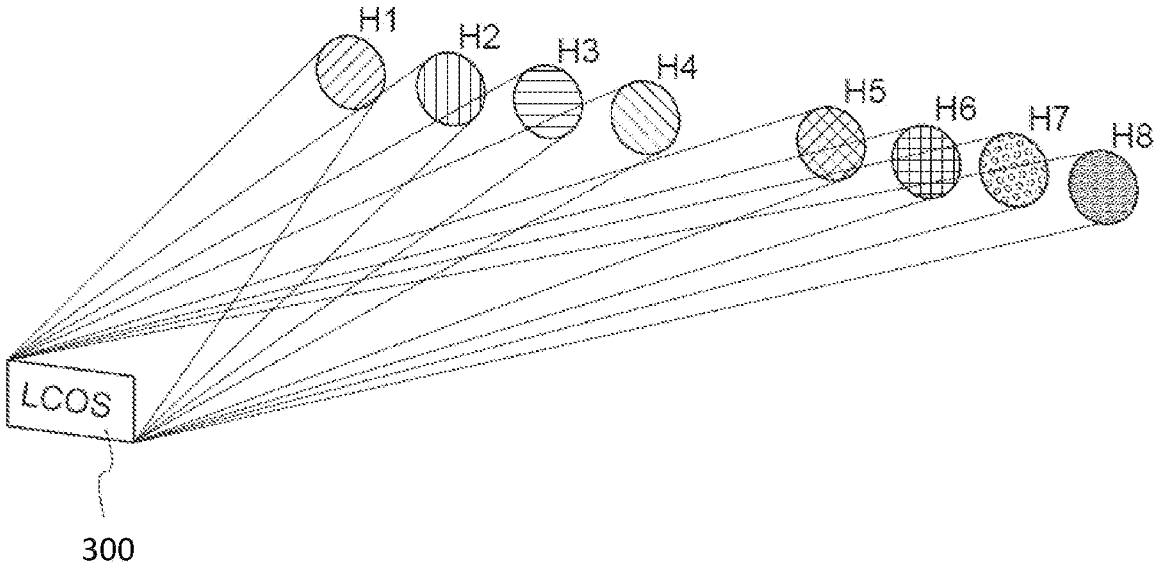
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
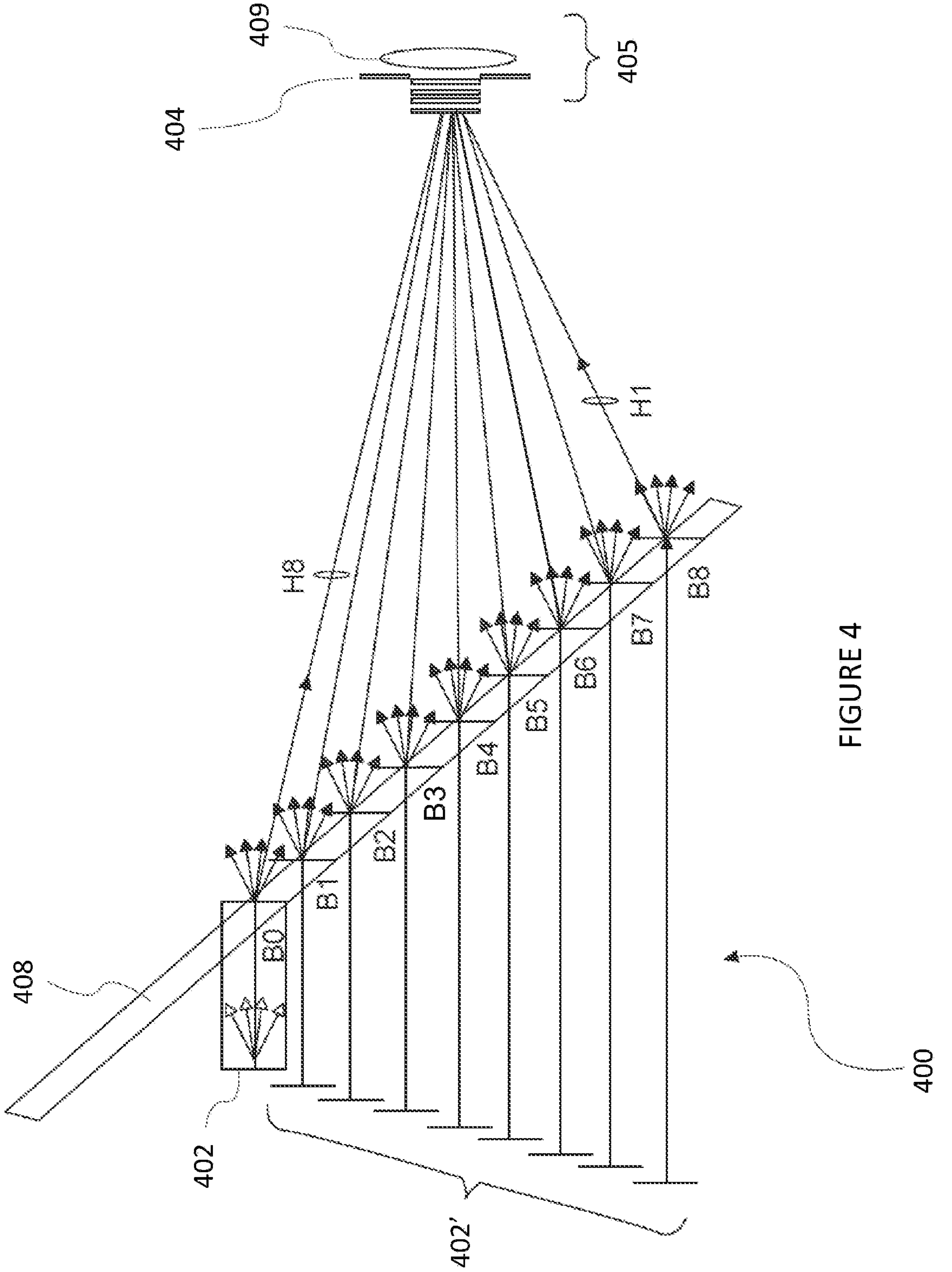
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

Although virtual images, which require the eye to transform received modulated light in order to form a perceived image, have generally been discussed herein, the methods and arrangements described herein can be applied to real images.

In embodiments, the hologram or holograms are channelling holograms as described above that divide the corresponding image content in the spatial domain by angle in the hologram domain.

Two-Dimensional Pupil Expansion—Example 1

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
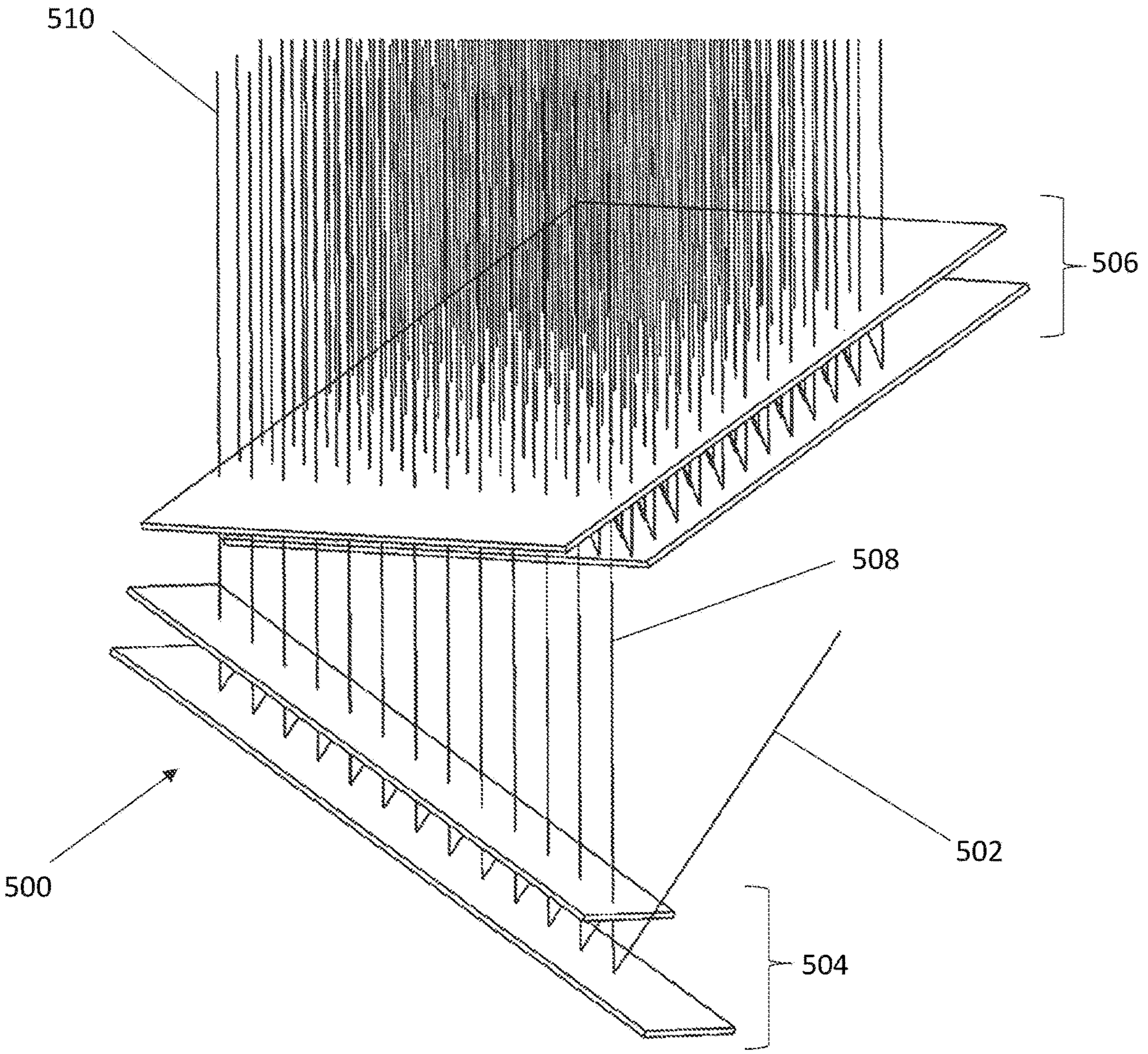
FIG. 5A shows a perspective view of a first example two-dimensional pupil expander comprising two replicators.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander").

Two-Dimensional Pupil Expansion—Example 2

FIG. 513 shows a perspective view of a second example system 500 comprising two replicators 520, 540 arranged for expanding a light beam 522 in two dimensions.

In the second example system 500, the first replicator is a solid elongated waveguide 520 and the second replicator is a solid planar waveguide 540. In particular, the first replicator/waveguide 520 is arranged so that its pair of elongate parallel reflective surfaces 524*a*, 524*b* are perpendicular to the plane of the second replicator/waveguide 540.

Figure 5B:
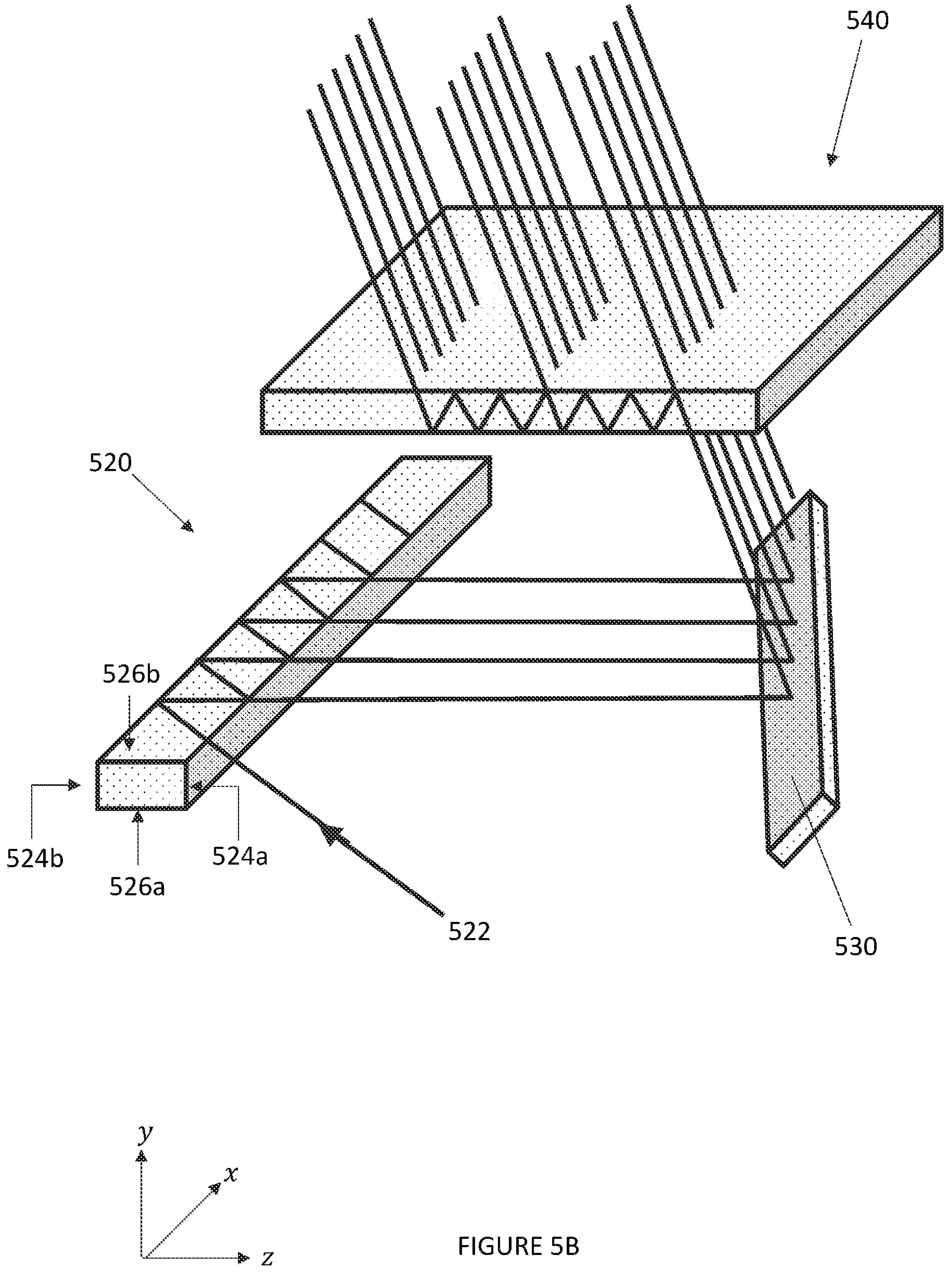
FIG. 5B shows a second example two-dimensional pupil expander comprising two replicators.

The second example system 500 comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, mirror 530 is arranged to receive light—comprising a one-dimensional array of replicas extending in the first dimension—from the output port/reflective-transmissive surface 524*a* of the first replicator/waveguide 520. The mirror 530 is tilted so as to redirect the received light onto an optical path to an input port in the (fully) reflective surface of second replicator 540 at an angle to provide waveguiding and replica formation along its length in the second dimension.

In the illustrated arrangement, the reflective-transmissive surface 524*a* of the first replicator 520 is adjacent the input port of the first replicator/waveguide 520 that receives input beam 522 at an angle to provide waveguiding and replica formation along its length in the first dimension. Thus, the input port of first replicator/waveguide 520 is positioned at an input end thereof at the same surface as the reflective-transmissive surface 524*a*. The skilled reader will understand that the input port of the first replicator/waveguide 520 may be at any other suitable position.

Accordingly, the arrangement of the second example system enables the first replicator 520 and the mirror 530 to be provided as part of a first relatively thin layer in a plane in the first and third dimensions (illustrated as an x-z plane). In particular, the size or "height" of the first planar layer—in which the first replicator 520 is located—in the second dimension (illustrated as they dimension) is reduced. The mirror 530 is configured to direct the light away from a first layer/plane, in which the first replicator 520 is located (i.e., the "first planar layer"), and direct it towards a second layer/plane, located above and substantially parallel to the first layer/plane, in which the second replicator 540 is located (i.e. a "second planar layer"). Accordingly, it may be said that the first planar layer containing the first replicator 520 and the mirror 530 is within the footprint of the second planar layer containing second replicator 540.

Thus, the overall size or "height" of the system—comprising the first and second replicators 520, 540 and the mirror 530 located in the stacked first and second layers/planes in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

British patent application GB2113454.9, filed 21 Sep. 2021 and incorporated herein by reference, discloses an image projector comprising a more advanced two-dimensional pupil expander may which be arranged in accordance with this disclosure.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

For the avoidance of doubt, the teachings of the present disclosure may be applied to one or both replicators of a two-dimensional pupil expander comprising two replicators.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. British patent application 2108456.1, filed 14 Jun. 2021 and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channelling described herein. It may be said that the control device is a light shuttering or aperturing device. The light shuttering device may comprise a 1D or 2D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

Dual Purpose Waveguiding

Figure 6:
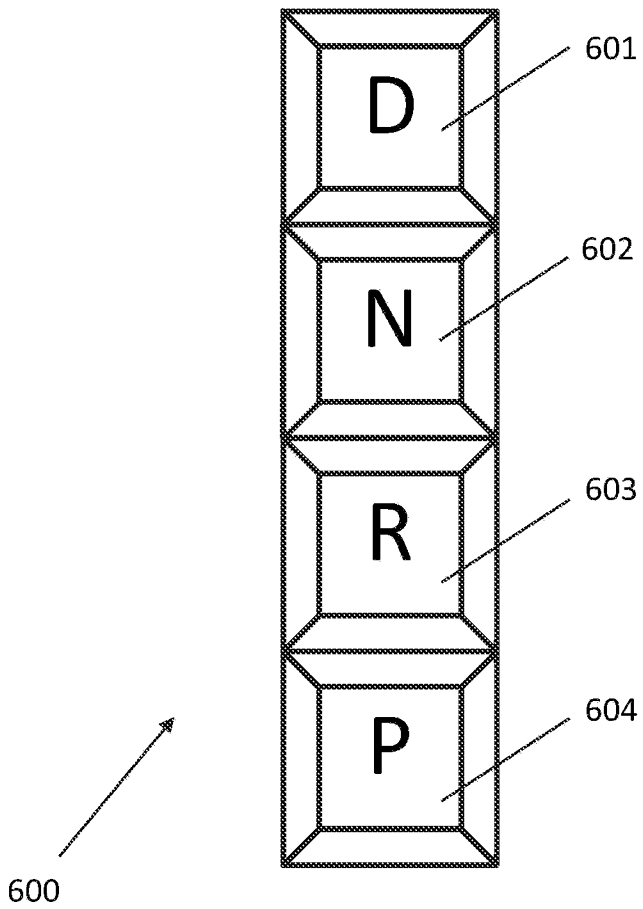
FIG. 6 illustrates a holographic image of a vehicle input device in accordance with embodiments.

FIG. 6 shows an example visual representation of an input device 600 of a vehicle. In accordance with this disclosure, the visual representation is formed inside the vehicle by holography. More specifically, the visual representation is formed by illuminating a hologram of a picture of the input device and forming a holographic reconstruction of the picture between the hologram and an eye-box. The size of the eye-box is increased (e.g. in two dimensions) by using a waveguide or pair of orthogonal waveguides as described herein for pupil expansion. In embodiments, the limiting pupil of the system is the display device for displaying the hologram. The waveguide may also be described as replicating the holographic wavefront output by the display device. The holographic wavefront encodes the information of the picture. The holographic wavefront forms a holographic image. The holographic image is a holographic reconstruction of the picture. The hologram may be calculated by any means such as using a phase retrieval algorithm or point cloud method. These methods are known in the art and a detailed description is not therefore required here. Three example methods as given above in the section entitled "hologram calculation". For completeness only, British patent publication GB2603517 of 10 Aug. 2022 (application GB2101666.2, filed 5 Feb. 2021), and incorporated herein by reference, discloses a hologram calculation method compatible with this disclosure. Unusually, in accordance with these methods, the holographic wavefront is delivered directly to the viewer's eyes. This approach is sometimes called "hologram-to-eye". In contrast with other methods of holographic projection, a screen is not required.

In embodiments, a holographic image of the vehicle input device is formed inside the vehicle. Whilst the earlier British patent applications incorporated by reference disclose forming a "virtual" holographic image (i.e. an image that appears upstream of the hologram), the person skilled in the art of holography will understand that the methods may be readily adapted to form "real" holographic images that appear downstream of the hologram. For example, adaptation of the method may simply comprise changing the propagation direction of light waves during hologram calculation. In accordance with this disclosure, holographic images are formed (by the viewer) inside the vehicle. For the avoidance of doubt, the holographic image is perceived by the viewer inside the vehicle owing to the nature of the holographic wavefront delivered directly to the viewer's eyes. A viewer that does not receive the holographic wavefront from the display device (e.g. a passenger in the vehicle) does not ordinarily see the image. It is sometimes said for simplicity that the viewer's eyes perform a hologram to image transformation. A holographic reconstruction is formed on each retina of the viewer. The holographic reconstruction received by each eye may be slightly different to address parallax. The holographic image may be 3D.

In FIG. 6, the visual representation of input device 600 of the vehicle is a drive selection unit by way of example only. The example input device 600 comprises a drive 601 (D), neutral 602 (N), reverse 603 (R) and park 604 (P) drive mode, as will be familiar to most readers. Conventionally, the input device may be a physical component comprising four independently operable push buttons. In accordance with this disclosure, the input device 600 is visually represented by a holographic image that may be two-dimensional or three-dimensional. The holographic image is perceived by delivering a holographic wavefront to the eye. The holographic wavefront is replicated by a waveguide or pair of orthogonal waveguides, as described above, to provide an acceptable eye-box size for practical application in a vehicle.

Figure 7:
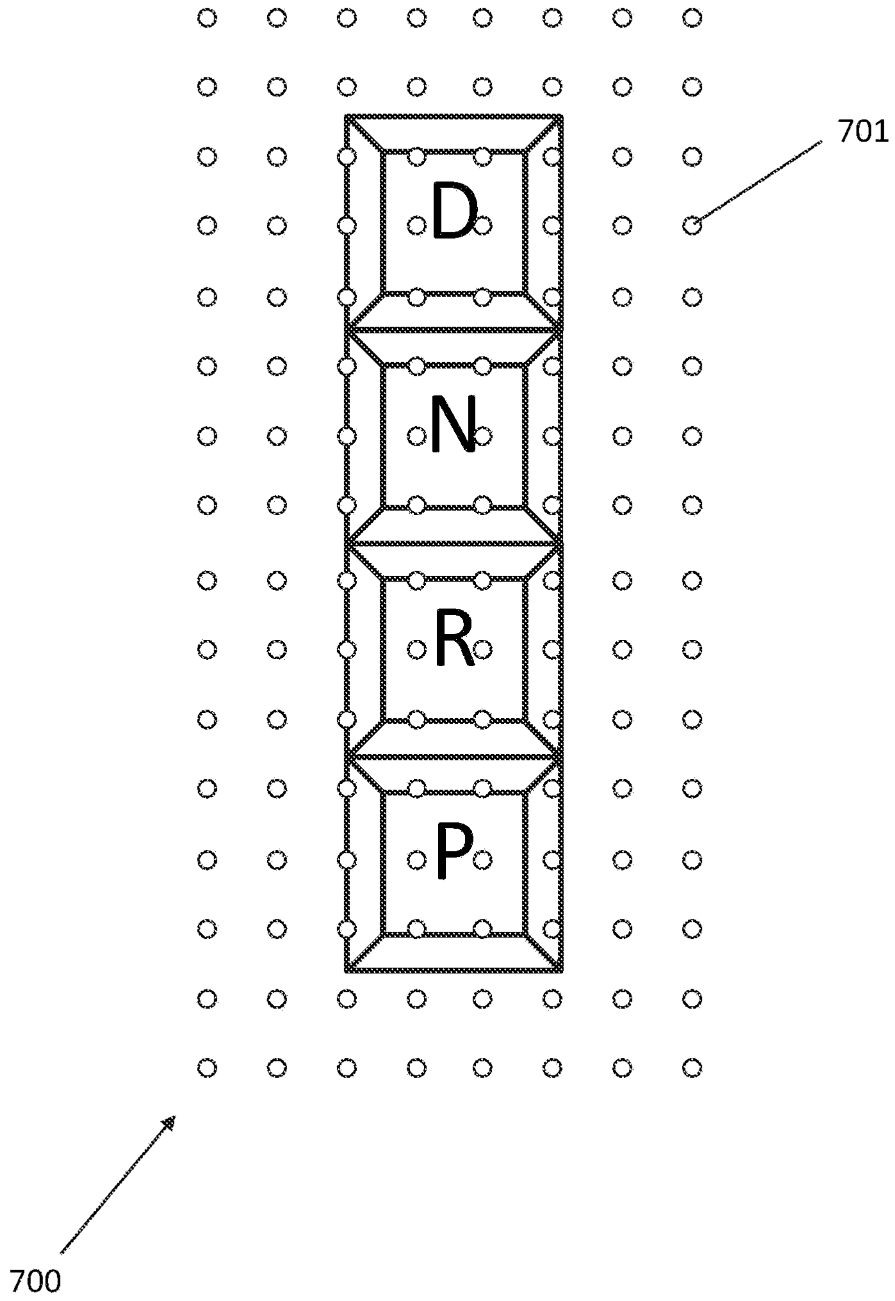
FIG. 7 illustrates a light pattern for object detection and, optionally, ranging that overlays the holographic image.

In accordance with this disclosure, a second wavefront is propagated via the waveguide or pair of orthogonal waveguides, to the region where the holographic image of the input device is perceived. FIG. 7 shows an example light pattern formed by the second wavefront. In the example of FIG. 7, the light pattern comprises a regular array of light spots, such as light spot 701, although the present disclosure is equally applicable to any light pattern such as any arrangement including at least one discrete light feature. In embodiments, the second wavefront comprises light of a wavelength outside the visible spectrum and so the viewer does not see the array of light spots overlaying the image of the drive selection unit even in embodiments in which the second wavefront is also delivered directly to the eye-box. In some embodiments, an image distance of the first wavefront is substantially equal to an image distance of the second wavefront. The light pattern illuminates a detection area substantially corresponding to the region of the holographic image. The light pattern may be pulsed or gated, or scanned in any conceivable pattern. In some embodiments, the light return is waveguided by the waveguide back to a light detector upstream of the waveguide. In some embodiments, the light detector includes a lens (e.g. magnifying or imaging lens) for creating the spatial correspondence between its field of view and its discrete detection elements.

In embodiments, a light detector is direct to the region of the visual representation of the input device 600. For example, a focal plane of the light detector may correspond with a focal plane of the second wavefront. The light detector is configured to detect light of the second wavefront. The light detector may be insensitive to light of the first wavefront. In some embodiments, the light pattern is formed using infra-red light and the detector is an infra-red detector such as an infra-red camera or SPAD array. In some embodiments, the non-visible system (i.e. the infra-red light engine and detector) is a light detection and ranging system such as disclosed in British patent publication GB2597771 of 9 Feb. 2022 incorporated herein in full by reference. In other embodiments, the non-visible system comprises a scanning light detection and ranging system, wherein all angles of the scan are replicated by the waveguide. The person skilled in the art of optics will understand how optical coatings (e.g. dielectric stacks) may be incorporated on the waveguiding surfaces to enhance the optical behaviour disclosed herein.

Figure 8:
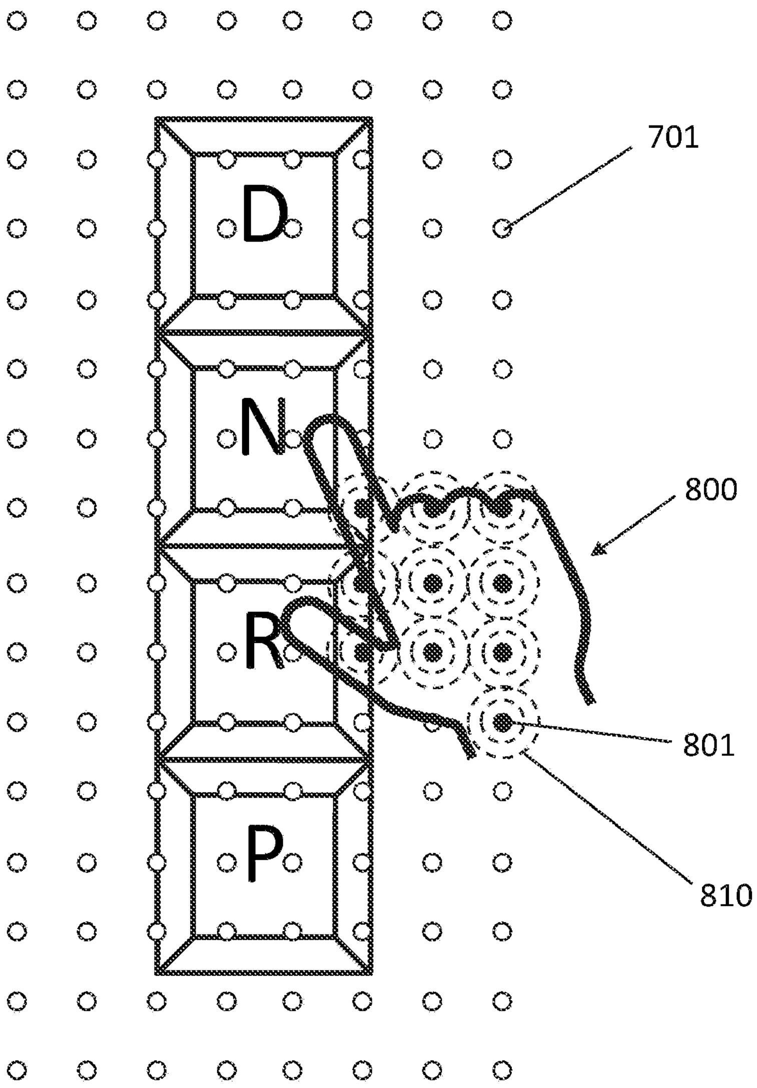
FIG. 8 shows the scattering and/or reflection of light of the light pattern in the presence of an object.

FIG. 8 shows that if an object 800—e.g. a human hand—is presented in the region of the holographic images, that object may act as a scatterer or reflector of light of the light pattern. FIG. 8 shows an example in which ten light spots, such as light spot 801, act as a scatterer of light of the light pattern/second wavefront—as represented by the dotted lines such as dotted line 810. The person skilled in the art of optics will understand how a light detector may be arranged to detect any light return signal from a scattering object in the vicinity of the holographic image or images. In a further advancement, the light detector comprises an array of individual detecting elements—e.g. CCD elements or SPAD elements—such that there exists a correlation between each individual detecting element and an area or volume in space. Accordingly, it is possible to determine where the light return was generated—i.e. the location of the object in the field of view of the detector. In these embodiments, the field of view of the detector may correspond with size of the light pattern.

Figure 9:
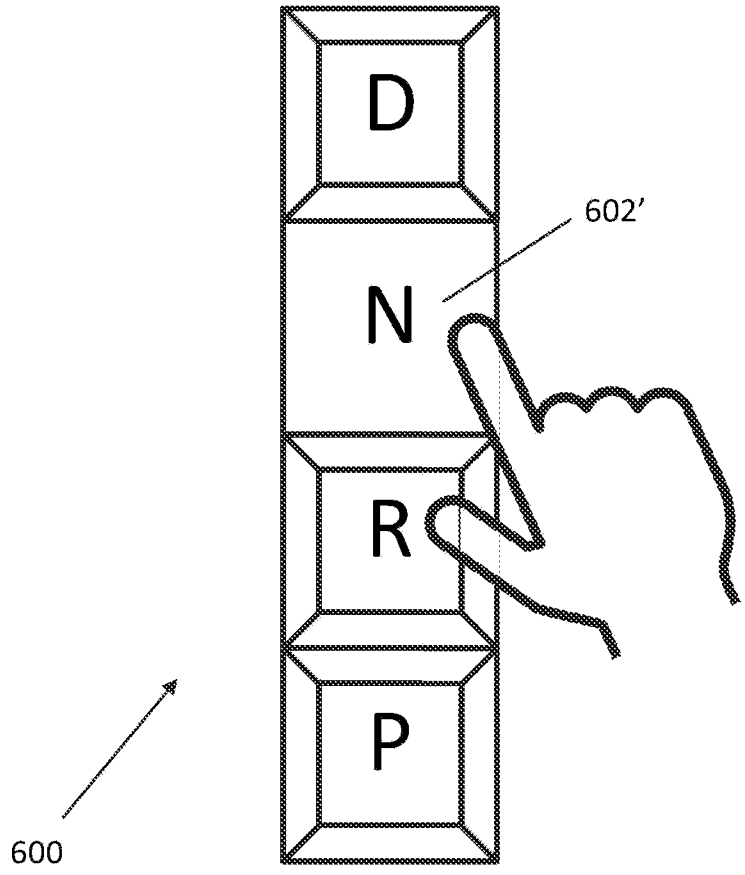
FIG. 9 shows a modified holographic image in response to detection of an object in a detection area.

In some embodiments, the visual representation of the input device or at least part of the input device is changed in response to detection of a light return. For example, as shown in FIGS. 8 and 9, if a pointing finger is detected in proximity to the neutral button (N)—as indicated by a light return signal or signals—a first visual representation 602 of the neutral button (N) may be replaced by a second visual representation 602' of the neutral button (N). The change to the visual representation of the neutral button is achieved by changing the hologram of the picture. The holograms may be stored in memory or calculated in real-time from a change to a source image. As the reader will appreciate, such an action may indicate that the button has been pressed or activated. The skilled person will appreciate how a simple feedback system may be incorporated between light source and detector to put such functionality into effect and the example of FIG. 9 may be applied to any input device of the vehicle or any type of change to the visual representation of the input device.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A head-up display for a vehicle, the head-up display comprising:

a first light engine arranged to form a first wavefront, wherein the first wavefront is a first holographic wavefront formed by illuminating a first hologram of a picture;

a second light engine arranged to form a second wavefront;

a waveguide comprising (i) an input arranged to receive the first holographic wavefront and second wavefront, and (ii) a pair of opposing reflective surfaces arranged to waveguide the first holographic wavefront and second wavefront therebetween by internal reflection, wherein a first surface of the pair of opposing reflective surfaces is partially transmissive thereby forming an output port for a plurality of replicas of the first holographic wavefront and second wavefront;

an eye-box for a viewer to receive the first holographic wavefront and form a first holographic image of the picture that appears in a region between the first hologram and eye-box, wherein the second wavefront forms a light pattern in the region; and a light detector arranged to receive a light return of the light pattern if an object is present in the region, wherein a field of view of the light detector corresponds with a size of the light pattern, and wherein the light pattern illuminates a detection area substantially corresponding to the region of the first holographic image.

2. The head-up display of claim 1, wherein the region is a region inside the vehicle.

3. The head-up display of claim 1, wherein the light pattern comprises an area of uniform illumination.

4. The head-up display of claim 1, wherein the second wavefront is a second holographic wavefront formed by illuminating a second hologram of the light pattern.

5. The head-up display of claim 1, wherein the second light engine is arranged to change a position of the second wavefront in time.

6. The head-up display of claim 1, wherein the second light engine and light detector form a light detection and ranging system.

7. The head-up display of claim 1, wherein the light detector comprises a plurality of independent light detecting elements, each having an independent field of view of the region, wherein the light detector comprises one of (i) a charge-coupled device (CCD) array or (ii) a single-photon avalanche diode (SPAD) array.

8. The head-up display of claim 1, wherein the first holographic wavefront comprises visible light and the second wavefront comprises invisible light.

9. The head-up display of claim 1, wherein the second wavefront comprises infra-red light and the light detector is a detector of infra-red light.

10. The head-up display of claim 1, wherein the light pattern comprises one or more light spots.

11. The head-up display of claim 10, wherein the picture comprises a visual representation of a physical input device of the vehicle.

12. The head-up display of claim 11, wherein the physical input device comprises at least one of a physical park, drive, neutral, or reverse drive selection button.

13. The head-up display of claim 11, wherein the physical input device comprises a physical start-stop button for the vehicle.

14. The head-up display of claim 11, wherein the first light engine is arranged to change the first hologram if the light detector detects a light return.

15. The head-up display of claim 14, wherein the change to the first hologram comprises changing at least one portion of the visual representation of the physical input device of the vehicle.

16. A method of holographic projection, the method comprising:

forming a first holographic wavefront by illuminating a first hologram of a picture;

forming a second wavefront;

receiving the first holographic wavefront and second wavefront at an input of a waveguide;

waveguiding the first holographic wavefront and second wavefront between a pair of opposing reflective surfaces of the waveguide by internal reflection;

outputting a plurality of replicas of the first holographic wavefront and second wavefront at a partially transmissive first surface of the pair of opposing reflective surfaces, the first surface thereby forming an output port;

receiving the first holographic wavefront at an eye-box for a viewer, wherein a first holographic image of the picture is formed for a viewer at the eye-box, the first holographic image appearing in a region between the first hologram and eye-box, wherein the second wavefront forms a light pattern in the region for a viewer at the eye-box; and detecting at a light detector a light return of the light pattern if an object is present in the region, wherein a field of view of the light detector corresponds with a size of the light pattern, and wherein the light pattern illuminates a detection area substantially corresponding to the region of the first holographic image.

17. Tangible, non-transitory, computer readable media comprising program instructions, wherein the program instructions, when executed by a computing system, cause the computing system to perform a method of holographic projection comprising:

forming a first holographic wavefront by illuminating a first hologram of a picture;

forming a second wavefront;

receiving the first holographic wavefront and second wavefront at an input of a waveguide;

waveguiding the first holographic wavefront and second wavefront between a pair of opposing reflective surfaces of the waveguide by internal reflection;

outputting a plurality of replicas of the first holographic wavefront and second wavefront at a partially transmissive first surface of the pair of opposing reflective surfaces, the first surface thereby forming an output port;

receiving the first holographic wavefront at an eye-box for a viewer, wherein a first holographic image of the picture is formed for a viewer at the eye-box, the first holographic image appearing in a region between the first hologram and eye-box, wherein the second wavefront forms a light pattern in the region for a viewer at the eye-box; and detecting at a light detector a light return of the light pattern if an object is present in the region, wherein a field of view of the light detector corresponds with a size of the light pattern, and wherein the light pattern illuminates a detection area substantially corresponding to the region of the first holographic image.

18. The tangible, non-transitory, computer readable media of claim 17, wherein the second wavefront is a second holographic wavefront formed by illuminating a second hologram of the light pattern.

19. The tangible, non-transitory, computer readable media of claim 17, wherein forming a first holographic wavefront comprises forming the first holographic wavefront via a first light engine, wherein forming a second wavefront comprises forming the second wavefront via a second light engine, and wherein the second light engine is arranged to change a position of the second wavefront in time.

20. The tangible, non-transitory, computer readable media of claim 19, wherein the second light engine and light detector form a light detection and ranging system.

* * * * *